United States Patent [19]

Wu

[11] Patent Number: 5,331,347
[45] Date of Patent: Jul. 19, 1994

[54] TELEVISION SYNC AND PHASE DETECTOR DISABLE CIRCUIT

[75] Inventor: Chun H. Wu, Singapore, Singapore

[73] Assignee: Thomson Consumer Electronics S.A., Courbevoie, France

[21] Appl. No.: 898,880

[22] Filed: Jun. 15, 1992

[51] Int. Cl.$^5$ .......................... H04N 5/12; H04N 5/04
[52] U.S. Cl. ............................ 348/536; 348/540; 348/541; 348/547; 331/1 A; 331/17; 331/20
[58] Field of Search ............... 358/158, 159, 153, 152, 358/154, 148, 181, 183, 188, 150; 331/1 A, 1 R, 25, 17, 20, 21; 348/500, 525, 530, 531, 533, 532, 536, 540, 541-544, 546, 547, 548; H04N 7/00, 5/04, 5/12

[56] References Cited

U.S. PATENT DOCUMENTS

| 4,468,699 | 8/1984 | Kröner ..................... 358/148 |
| 4,544,954 | 10/1985 | Chen . |
| 4,634,939 | 1/1987 | Deitz . |
| 4,636,860 | 1/1987 | Duijkers ................... 358/158 |
| 4,677,484 | 6/1987 | Pitsch . |
| 4,689,582 | 8/1987 | Balaban et al. ............. 358/158 |
| 4,729,024 | 3/1988 | Kawai et al. . |
| 4,812,783 | 3/1989 | Honjo et al. ............... 358/158 |
| 4,896,214 | 1/1990 | Dieterle et al. ............ 358/148 |
| 4,942,472 | 7/1990 | Imbert et al. .............. 358/158 |
| 5,038,116 | 8/1991 | Motté ...................... 358/158 |
| 5,153,725 | 10/1992 | Masaike ................... 358/153 |

FOREIGN PATENT DOCUMENTS

| 0059379 | 2/1982 | European Pat. Off. . |
| 0186433 | 7/1986 | European Pat. Off. . |
| 0309717 | 4/1989 | European Pat. Off. . |
| 2652474 | 3/1991 | France . |

Primary Examiner—James J. Groody
Assistant Examiner—Michael H. Lee
Attorney, Agent, or Firm—Joseph S. Tripoli; Joseph J. Laks; Francis A. Davenport

[57] ABSTRACT

A television receiver is subject to certain operational conditions which result in poor, unreliable or unusable separated sync pulse signals. During such conditions the use of unsuitable sync signals for synchronization and the like is inhibited to prevent mis-triggering or spurious synchronization. A television receiver contains circuitry for extracting a sync signal, a voltage controlled oscillator (VCO) for generating a scanning signal, and a comparator comparing the scanning signal to the separated sync signal. A microprocessor is used to verify the separate sync signal for invalid or unusable signals and has an output activated during such conditions. The phase comparator has a current output coupled to a integrating capacitor or LPF which develops a varying positive or negative voltage to raise or lower the frequency of the VCO for scanning in phase with the separated sync. During conditions of unusable separated sync pulse signals, the microprocessor output causes the integrating capacitor or LPF to be coupled to a voltage source for forcing the VCO to a maximum frequency. Also, during periods of unusable sync the microprocessor decouples the separated sync signal from the vertical deflection generating circuit, allowing the vertical deflection generating circuits to free run. Setting the horizontal frequency to a maximum value and inhibiting vertical deflection synchronization eliminates instability of on-screen displays during periods of unusable sync.

7 Claims, 2 Drawing Sheets

TELEVISION SYNC AND PHASE DETECTOR DISABLE CIRCUIT

This invention relates to the field of sync or phase detector disable circuits for television receivers.

BACKGROUND OF THE INVENTION

A horizontal oscillator of a television receiver is controlled to be in synchronism with the horizontal sync signal in a video signal. The horizontal oscillator is often a voltage controlled oscillator or VCO which provides a horizontal signal in phase with the sync signal. A phase comparator having an output coupled to the VCO compares the sync signal obtained from a sync separator with a horizontal output signal derived from the horizontal deflection circuit. The phase comparator includes a current output that charges or discharges a capacitor of a low pass filter to generate a DC control voltage for the VCO such that the frequency is increased or decreased within an available range, thereby keeping horizontal deflection in synchronism with the received horizontal sync.

During certain states of operation of the television receiver the sync signal may be missing or undependable. The sync signal may be missing or undependable when, for example, the tuner is set to a frequency that has no transmitted signal, when the signal is noisy or very weak, or when the transmitted signal has been scrambled to remove or reposition the sync.

It is known, that during the certain operational states where the sync signal may be missing or unusable, it is desirable prevent the anomalous triggering or mis-synchronisation of the horizontal oscillator. Such methods generally function by inhibiting the coupling of a composite video signal to a synchronizing pulse separating means. With the input to a sync separator inhibited, the output may well assume either the supply voltage or ground potential. This output will be coupled to a input of a phase comparator which controls the horizontal oscillator. Hence, with the separated sync input inhibited, the oscillator will tend to operate at a nominal frequency determined by the output voltage from the phase comparator. It is also known that it is desirable to prevent the horizontal oscillator from assuming a lower than nominal frequency to avoid activation of over voltage protection.

A control output of a microprocessor may be used to block transmission of the signal from the sync separator to the phase comparator in order to ignore the output of the sync separator. The voltage controlled oscillator is then allowed to free run. Where the voltage controlled oscillator is crystal controlled, e.g., with a ceramic resonant oscillator, merely decoupling poor sync from the sync separator from the phase comparator may be inadequate to ensure stable operation of the horizontal oscillator in view of the high internal loop gain of such oscillators. Internally generated noise in the phase detector can provide spurious signals which cause the frequency of the horizontal oscillator to shift irregularly.

An on-screen display (OSD) may be caused to jitter or become ragged or vary in size or position during conditions where the sync signal is intermittent or unreliable. In extreme cases the on-screen display becomes unreadable because the circuitry for detecting the sync is mis-triggered or triggered erratically with the consequence that the scanning frequencies are varied irregularly, with the result that the on-screen characters are incorrectly read out.

SUMMARY OF THE INVENTION

A television apparatus has a controllable oscillator which produces a deflection signal within a range of frequencies. The oscillator is controlled by a comparator which has input signals from a sync signal generating means and the controllable oscillator output. A means for sensing an unsuitable sync signal condition has an output coupled to the comparator output such that during an unsuitable sync condition the controllable oscillator assumes a fixed frequency.

In a further inventive feature, unsuitable or missing vertical sync signals are prevented from mis-triggering a vertical deflection generating circuit.

DETAILED DESCRIPTION

Figure 1:
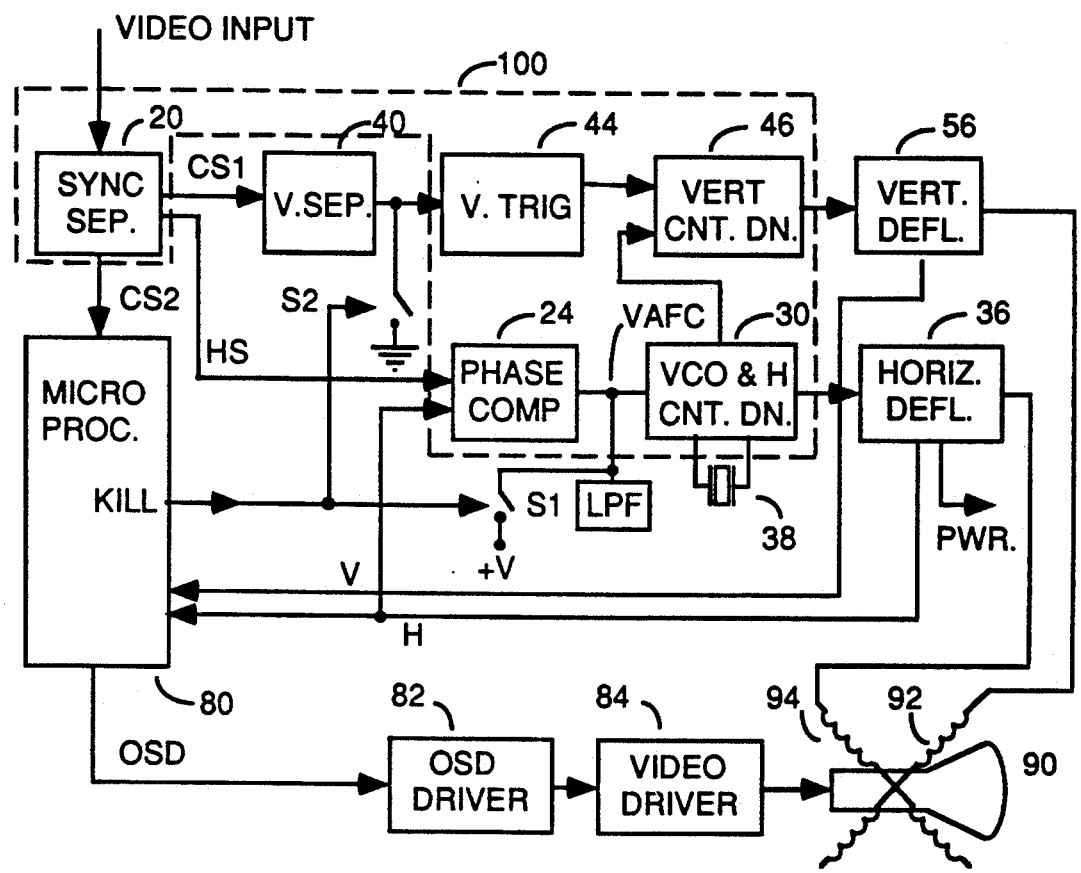
FIG. 1 is a schematic diagram illustrating television receiver circuitry, including sync disabling circuitry embodying the invention.

A television receiver, as partly shown in FIG. 1, includes an IC 100, which contains multiple circuit functions including sync separation, VCO, horizontal and vertical countdown, plus other audio, video and RF functions, which are not shown. A sync separator 20, receives a composite video signal, which may originate from either a baseband video input or from the RF video demodulator. The sync separator produces composite sync pulses CS1 and horizontal sync pulses HS which are coupled to synchronize operation of horizontal and vertical deflection circuits. In addition, the sync separator has an output of composite syncs CS2 coupled to a microprocessor 80, which verifies the validity of the sync signal. An on screen display output OSD is active even when one or both of the horizontal and vertical sync pulses are missing, as will be described later.

Sync separator output CS1 is coupled to a vertical sync separator 40 which in turn is coupled to a vertical trigger generator 44. The vertical trigger generator 44 produces a vertical rate pulse which resets a vertical down counter 46. Down counter 46 divides a signal from a horizontal frequency down counter to produce a vertical rate signal. The vertical rate signal is coupled to a vertical deflection generator 56 which generates vertical signal V and vertical deflection current in deflection coil 92.

Oscillator 30 comprises a voltage controlled oscillator 32, and a count down circuit 34. The VCO frequency is selected to be the 32nd multiple of the horizontal output frequency, hence by dividing down from the VCO frequency the horizontal frequency is produced. The output of the oscillator 32 is coupled to horizontal deflection circuit 36, to which a flyback transformer derived operational power supply is coupled, depicted in FIG. 1 as PWR, and shown in FIG. 2. Horizontal deflection circuit 36 drives a horizontal deflection winding 94, for scanning the electron beams of a cathode ray tube (CRT) 90.

The control input to the horizontal VCO 32 is coupled to the output of a phase comparator 24. Phase comparator 24 provides a positive or negative current at its output, increasing or reducing the AFC voltage, VAFC, developed by a low pass filter LPF for varying the oscillation frequency of VCO 32. The phase comparator inputs are coupled to the separated horizontal sync signal HS from sync separator 20, and to the flyback signal H from horizontal deflection circuit 36. When the sync and the flyback pulse are in phase, the net current output of the phase comparator is substantially zero. When the flyback pulse lags the sync, phase comparator 24 charges the LPF to increase the frequency of VCO 32. When the flyback pulse leads the sync, phase comparator 24 draws current from the LPF, to lower the DC control voltage input to VCO 32 and reduce the horizontal frequency. In this manner the horizontal oscillator tracks the frequency and phase of the separated sync signal.

It is an inventive feature to couple an output signal CS2 of sync separator 20 to microprocessor 80 which verifies the validity of the sync signal CS2. During periods of receiver operation that result in poor or unusable sync, microprocessor 80 forces the input of VCO 32 to its maximum level, thus increasing the frequency of horizontal output to maximum. Microprocessor 80 has an output coupled to circuitry shown diagrammatically as switches S1 and S2. When the microprocessor 80 detects missing or unusable synchronizing pulses the output KILL activates switches S1 and S2. Switch S1 couples the phase detector LPF, which coupled to VCO 32 input terminal, to the VCO supply voltage +V. Applying a positive, stable and fixed VCO supply voltage to the VCO input, advantageously causes the VCO to be o driven to a maximum frequency.

The controllable frequency range of VCO 32 is centered about a frequency defined by crystal 38, for example a ceramic resonator, near 32fH, where fH is the nominal horizontal frequency. Ceramic resonator oscillators are characterized by high loop gains and may be susceptible to noise problems which result in the oscillator frequency or phase varying randomly. If the input to VCO oscillator 32 is desirably forced to a fixed voltage level, any possible variation of the horizontal frequency due to noise coupled to the input of VCO 32 is precluded. By employing a forced, fixed VCO voltage during periods of poor or unusable syncs, results in the horizontal output frequency remaining stable. The stable horizontal frequency results in any on-screen display (OSD) characters and the like, being generated correctly and stably positioned horizontally.

Microprocessor 80 generates a signal coupled to on-screen display driver 82 for defining characters to be displayed. A vertical pulse V and a horizontal signal H, are coupled to the microprocessor. The vertical signal resets an internal line counter in microprocessor 80, thereby positioning the OSD output screen position relative to vertical sync. The geometry of a character to be displayed is determined by a stored look-up table, referenced to successive horizontal lines (H pulses) and positions within a given line. Microprocessor 80 defines the appropriate screen position for the on-screen characters by counting horizontal lines, and timing the delay for a given character position from the beginning of a given scan line. The output of on-screen display driver 82 is coupled to video driver 84 to modulate the electron beam as needed to form the desired characters on the screen of CRT 90.

In FIG. 1, the sync disabling signal KILL is coupled from microprocessor 80 to the vertical sync separator 40 to inhibit the coupling of spurious or erroneous sync signals from vertical sync separator circuit 40 to vertical trigger generator 44. Unlike the horizontal section, wherein the oscillator is driven to a maximum frequency during sync disabling, in the vertical section the separated vertical sync is advantageously shunted by switch S2. Switch S2 is operative during sync disabling situations and grounds the input to vertical trigger generator 44, preventing mis-triggering of vertical countdown stage 46. Thus vertical countdown stage 46 free runs, cyclically counting down a signal from the horizontal oscillator 30, by a preset number which results in an output frequency of approximately vertical rate.

Under non-sync kill conditions the shunt switch is inoperative and vertical sync is separated at 40 and coupled to vertical trigger generator 44. The vertical trigger generator resets countdown stage 46 forcing it into vertical synchronism with the separated vertical sync thus effectively coupling the separated vertical sync through to deflection stage. The counted down vertical rate signal is coupled to the vertical deflection stage 56 which drives vertical deflection coil 92.

Figure 2:
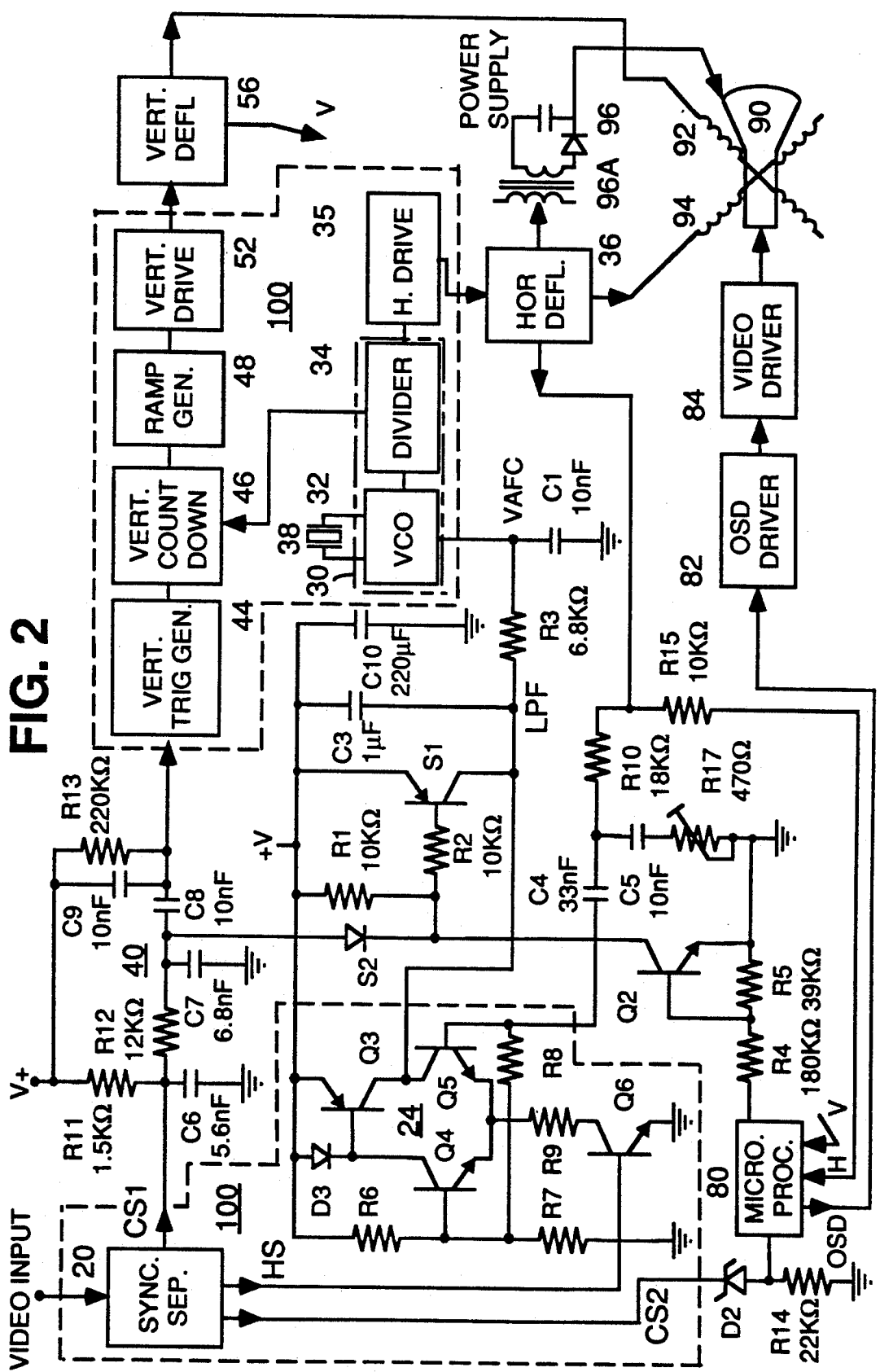
FIG. 2 is a more detailed schematic diagram illustrating television receiver circuitry including sync disabling circuitry embodying the invention.

FIG. 2 illustrates an embodiment of the invention in greater detail, using reference numerals which correspond to the numerals in FIG. 1 for corresponding elements. Crystal controlled VCO 32 operates at 32fH, and a divider 34 is coupled to the VCO output to divide the oscillator frequency down to the nominal horizontal scanning frequency for input to a horizontal drive stage 35 and horizontal deflection circuit 36. A power supply 96 is coupled to the horizontal deflection circuit 36, and includes a voltage rectifier driven from a high voltage secondary winding of a flyback transformer 96A to provide an ultor voltage to cathode ray tube 90.

Horizontal retrace or flyback pulses H developed in horizontal deflection circuit 36 are supplied to phase comparator 24, and provide an input to microprocessor 80 for line counting. The retrace pulses are coupled to phase comparator 24 via an integrator including a resistor R10, a capacitor C5 and a variable resistor R17. Integration of the retrace pulse produces a ramp, which is AC coupled via a series capacitor C4 to phase detector 24, at the base of transistor Q5. Variable resistor R17 provides phase adjustment of the ramp signal which results in control of the horizontal position of the displayed picture.

Transistors Q4 and Q5 are coupled in a differential amplifier arrangement. The base of transistor Q4 is coupled to a voltage divider defined by resistors R6 and R7. The emitter of a PNP transistor Q3 is coupled to the positive supply, and the base of transistor Q3 is coupled to the junction of the collector of a transistor Q4 and the cathode of a diode D3. Transistor Q3 and diode D3 form a switchable constant current source coupled to the collector of transistor Q5. The base of transistor Q5 is also coupled via a resistor R8 to a voltage divider formed by resistors R6 and R7, for DC biasing the phase comparator input. The emitters of differential transistors Q4 and Q5 are coupled together and to the collector of a keying transistor Q6 through a resistor R9. The separated horizontal sync pulses HS are coupled to the base of transistor Q6. The emitter of transistor Q6 is grounded, causing the differential amplifier to conduct through either transistors Q4 and Q5 when HS is positive with respect to ground.

When the HS pulses from sync separator 20 are centered on the zero crossing of the AC coupled flyback signal ramp from the integrator, the net charge accumulated in filter capacitor C3 during one horizontal period is zero. The time of charging capacitor C3 by current source transistor Q3 is equal to the time of discharging through current sink transistor Q5. When the phase of HS leads that of the integrated the flyback pulse, filter capacitor C3 is charged for a longer time than it is discharged and the accumulated voltage VAFC, at the control input to VCO 32 is increased. Conversely when HS lags the integrated flyback pulse, filter capacitor C3 is discharged for a longer time than it is charged, decreasing the control input voltage to VCO 32. This occurs for every horizontal line interval, causing VCO 32 to remain phase locked to the HS signal from sync separator 20.

The composite sync signal CS2 from sync separator 20, is coupled to microprocessor 80 via a potential divider formed by zener diode D2 and a resistor R14 connected to ground. Microprocessor 80 monitors sync signal CS2 for any occurrence of missing or invalid sync pulses and in addition for autoprogramming purposes. In accordance with an inventive feature, microprocessor 80, responsive to invalid or noisy syncs, produces a positive sync disabling output KILL, which prevents AFC voltage changes in filter capacitor C3. Earlier methods of protection against unusable syncs tended to inhibit the separation of sync pulses.

The KILL output from microprocessor 80 is coupled via series resistors R4 and R5 which form a potential divider with the junction of the resistors coupled to the base of a transistor Q2. The collector of transistor Q2 is coupled to a positive supply by a resistor RI and is further coupled to a clamping diode which forms switch S2, and coupling resistor R2 at the base of a transistor which forms switch S2. The emitter of PNP transistor S1 is connected to +V, the collector is connected to a capacitor C3, and via a resistor R3, to integrating capacitor C1 and thus to a filter input of VCO 32.

During periods of missing or undependable sync, microprocessor 80 produces a positive KILL signal which is coupled to the base of transistor Q2 which turns on, forcing the collector to be close to ground potential. The ground at the collector of transistor Q2 is coupled to the base of transistor S1 causing it to turn on and short capacitor C3 to the supply voltage level +V. Under normal non-KILL operation the minimum voltage applied across capacitor C3 is determined by the maximum voltage developed by transistor Q3 collector which corresponds to approximately VceSAT. below the +V supply. Transistor S1 also couples, via resistor R3, integrating capacitor C1 and the VCO input to the supply voltage level +V. With the VCO input connected to the supply voltage, the VCO frequency is forced to the highest operating frequency. This increases the horizontal scanning frequency to a maximum value. To prevent overshoot and to stabilize operation of the horizontal VCO loop, the time constants defined by capacitors C1 and C3, together with resistor R3, are relatively long in comparison with the scanning frequency, and normally prevent rapid variations in the frequency and phase of VCO 32.

A composite sync signal from sync separator 20, is coupled to the vertical sync trigger generator 44 via a vertical sync integrator network 40 comprising capacitors C6, C7, C8 and C9 and resistors R11, R12, and R13. The anode of shunt clamping diode S2, is connected to the junction of capacitors C7, C8 and resistor R12. The cathode of diode S2 is coupled to the collector of transistor Q2 and as described previously, a positive KILL output causes transistor Q2 to conduct, connecting diode S2 cathode to ground via the transistor collector emitter junction. Thus, vertical sync pulses are attenuated by the potential divider formed by series resistor R12 and shunt connected diode S2 thereby eliminating false or spurious triggering of generator 44. Thus, when the KILL signal is high, vertical sync trigger generator 44 is no longer coupled to separated vertical syncs and does not reset the vertical countdown stage 46. The counter will count cyclically, dividing a horizontal oscillator signal to produce a approximate vertical frequency output. The counted down, vertical rate signal, is coupled to deflection circuit 56 through a ramp generator 48 and a vertical drive section 52. An output from the vertical deflection circuit 56 is coupled to the microprocessor 80 to provide vertical positioning information for generation of the on screen display.

During periods of missing or unusable sync, the action of the KILL output advantageously prevents spurious vertical counter resetting. Hence, the vertical counter provides a stable, approximately vertical rate signal to the OSD generator resulting in an OSD which does not jitter vertically.

Similarly, during sync kill situations, the horizontal scanning frequency is increased to a maximum value and the OSD operates in a stable manner pending resumption of resynchronism with the sync signal.

What is claimed is:

1. A television apparatus, comprising:
   means for generating a sync signal;
   a controllable oscillator operable to generate a deflection signal within a range of frequencies;
   a comparator having inputs coupled to the sync signal generating means and to the controllable oscillator and having an output for providing a correction signal to the controllable oscillator to vary the frequency of the deflection signal, the sync input of the comparator being supplied with signals from said means for generating a sync signal under a condition of unsuitable sync signal generation;
   means for sensing said unsuitable sync signal condition;
   a first means coupled to said sensing means and to the output of the comparator for producing fixed frequency operation of said controllable oscillator during said unsuitable sync condition; and
   a second means coupled to said sensing means and to said sync signal generating means to inhibit coupling thereof to a vertical signal deflection generating means during said unsuitable sync condition.

2. A television apparatus, comprising:
   means for generating a sync signal;
   a controllable oscillator operable to generate a deflection signal within a range of frequencies;
   a comparator having inputs coupled to the sync signal generating means and to the controllable oscillator and having an output for providing a correction signal to the controllable oscillator to vary the frequency of the deflection signal, the sync input of the comparator being supplied with signals from said means for generating a sync signal under a condition of unsuitable sync signal generation;
   a microprocessor for sensing said unsuitable sync signal condition coupled to said means for generating a sync signal and having an output operable to couple a stable fixed voltage level to an input of said controllable oscillator during said unsuitable sync condition;

a vertical sync separating means coupled to said means for generating a sync signal and having an output coupled to a vertical deflection signal generator; and a switching means coupled to said vertical sync separating means, and responsive to said output of said microprocessor, to inhibit said vertical sync separating means during said unsuitable sync condition whereupon said vertical deflection signal generator free runs.

3. A television apparatus, comprising:

means for generating a sync signal;

a controllable oscillator operable to generate a deflection signal within a range of frequencies;

a comparator having inputs coupled to the sync signal generating means and to the controllable oscillator and having an output for providing a correction signal to the controllable oscillator to vary the frequency of the deflection signal, the sync input of the comparator being supplied with signals from said means for generating a sync signal under a condition of unsuitable sync signal generation;

a microprocessor for sensing said unsuitable sync signal condition coupled to said means for generating a sync signal and having an output operable to couple a stable fixed voltage level to an input of said controllable oscillator during said unsuitable sync condition;

a vertical sync separating means coupled to said means for generating a sync signal and having an output coupled to a vertical deflection signal generator; and a switching means coupled to said vertical deflection signal generator, and responsive to said output of said microprocessor, to inhibit vertical synchronization during said unsuitable sync condition whereupon said vertical deflection signal generator free runs.

4. The television apparatus according to claim 1, further comprising a capacitor coupled in shunt between said comparator output and said input of the controllable oscillator, said comparator output being operable to charge and discharge the capacitor upon the relative phases of the sync signal and the controllable oscillator.

5. The television apparatus according to claim 3, further comprising an on-screen display coupled to the microprocessor and to a video driver, the on-screen display being operable to modulate an input to the video driver for providing on-screen display characters.

6. The television apparatus according to claim 3, wherein the microprocessor is operable to generate a stable on-screen display during said unsuitable sync condition.

7. The television apparatus according to claim 3, further comprising a horizontal deflection circuit coupled to a deflection coil for scanning an electron beam and an output transformer said output transformer being coupled to a power supply to generate a high voltage supply coupled to a cathode ray tube ultor, wherein said controllable oscillator is operable to define a horizontal scanning signal, and during said unsuitable sync condition said horizontal scanning signal assumes it maximum frequency.

* * * * *